Sept. 22, 1970   R. F. KIENLE ET AL   3,530,212
METHOD OF MAKING GLASS RESIN LAMINATES
Filed Feb. 16, 1967

INVENTORS
Richard F. Kienle,
James R. Frenchik, &
Edward P. Harris

BY
Peter P. Kozak
ATTORNEY

# United States Patent Office 3,530,212
Patented Sept. 22, 1970

3,530,212
METHOD OF MAKING GLASS RESIN LAMINATES
Richard F. Kienle, Trotwood, and James A. Frenchik and Edward P. Harris, Dayton, Ohio, assignors to General Motors Corporation, Detroit, Mich., a corporation of Delaware
Filed Feb. 16, 1967, Ser. No. 616,704
Int. Cl. B29c 24/00; B29g 5/00
U.S. Cl. 264—137
3 Claims

ABSTRACT OF THE DISCLOSURE

A glass fiber reinforced synthetic resin structural member, such as for example, a single leaf automobile spring having high flexural strength and low void content is fabricated by thoroughly impregnating a plurality of individual glass filament rovings with a thermosetting resin; flexing, bending and heating the impregnated rovings to completely wet the glass filaments of each roving, to decrease the viscosity of the resin, and to expel entrained air from the resin; performing the rovings while the resin is still not completely cured by aligning them in side-by-side relationship and expelling air entrained therebetween, as well as excess resin, to form a moldable glass roving mass which is nearly void-free and in which each filament is coated with resin; and finally molding the preformed rovings under pressure in a hot mold to cure the resin.

---

This invention is related to fiber glass resin impregnated structural members of the type that the glass filaments are all aligned in substantially parallel relationship. More particularly, the invention relates to a method of fabricating such an article wherein a plurality of individual rovings are separately but simultaneously thoroughly impregnated with a synthetic thermosetting resin by a specific technique and then are molded into an article having less than about 3% void volume, preferably less than 2% void volume, and high physical strength.

Glass fiber reinforced plastic articles of manufacture wherein individual glass filaments are bonded to one another with a synthetic resin, have been commercially available for some time. Examples of such articles are fishing rods, bows, glass pipe, and the like. The tensile strength of an individual glass filament is very high and it would be expected that the combination of a large number of such filaments bonded together with thermosetting resin would provide an article having high physical strength, substantially greater than that of steel on a weight-to-weight basis. However, in actual practice it has been found that it is very difficult, particularly on a high volume production basis, to thoroughly wet the individual fibers with resin and to expel entrained gases such as air so as to eliminate defects within the laminate structure. Voids or other types of defects within the laminate act as stress concentration sites around which an applied stress cannot be transmitted uniformly throughout the structure. Instead the stress is concentrated at the defects frequently reaching a level greater than the strength of the article. This results in the failure of the structure under an average load which normally would not exceed the physical limitations of the laminate.

A common method of manufacture of elongated articles such as fiber glass rods, pipe, bows and the like is to draw a plurality of fiber glass rovings through a liquid thermosetting resin and subsequently through a hot mold in which the resin is cured to a rigid thermoset state. Depending upon the effectiveness of the processing, the articles produced typically may be expected to have an ultimate strength lying somewhere in the range of 80,000 p.s.i. to about 180,000 p.s.i. The flexural stress for a fatigue life of about 500,000 cycles is typically in the range of 40,000 to 60,000 p.s.i. maximum and the void volume inherent in these prior art structures is about 5–10% of the volume of the structure itself. These relatively low properties are tolerated, however, because the method of impregnating and molding a large number of rovings simultaneously requires little time and for that reason is relatively economical. In applications however, where the article to be produced is to be a structural member, such as an automobile spring, the relatively low cost, lightweight material is attractive, but the physical properties of the finished product are inadequate.

Accordingly, it is an object if this nivention to provide a composite glass filament reinforced-synthetic resin article which is particularly suitable for use as a load bearing structural member, such as a single leaf automobile spring, having constant cross sectional area with varying shape and an ultimate strength of at least 200,000 p.s.i., and a void volume of less than about 3%.

It is another object of this invention to provide a method of impregnating a plurality of individual rovings with a liquid thermosetting resin and of molding the impregnated rovings in side-by-side relatonship into a structural member having low void volume and high physical strength, the method being adaptable to high volume production.

These and other objects are accomplished in accordance with the invention by thoroughly impregnating a plurality of individual, spaced apart, untwisted glass filament rovings with a liquid synthetic thermosetting resin; suitably flexing and heating the rovings to expel entrained air or other gases from the resin and to completely coat the individual filaments of each roving with a layer of resin; and then molding the rovings in side-by-side, untiwsted relationship, to form a strong structural member with less than about 3% void volume. The invention may be practiced to produce a single article at one time or it may be employed to continuously produce a plurality of identical articles from rovings of indefinite length. In the preferred case of a continuous process, a plurality of long, spaced apart glass filament rovings are drawn under suitable tension through a bath of liquid thermosetting reisn. In passing through the bath, the rovings are worked by bending and flexing so that the liquid resin can flow between and around each glass filament therein. The individual impregnated rovings still spaced apart, may be further worked after being drawn from the resin bath by bending around a rod or roller to further wet the individual filaments with resin.

The resin impregnated rovings are then uniformly heated to reduce the viscosity of the resin. The suitable period of heating and resin viscosity obtained is a function of the curing properties of the particular resin employed. When an epoxy-type resin is used, as is preferred, the rovings are heated for a time sufficient to react the resin until its viscosity has increased markedly, indicating the formation of the B-stage resin, and then further heated for a time until the viscosity has decreased substantially, preferably to the lowest viscosity obtainable prior to a final cure. The hot low viscosity resin is more capable of expelling air or any other entrained gases and of flowing between and around the individual filaments of each glass roving. The hot spaced apart rovings are then brought together in side-by-side relationship into substantially the cross section of the article which is to be formed. During the preforming or prealignment of the rovings prior to molding, air which is entrapped between the rovings as they are brought together, is expelled through the low-viscosity resin. At the same time, excess resin is exuded and removed from the mass. The preformed roving mass is then molded within a suitable two-part preheated mold. Of course, the cavity of the mold defines the configuration of the article to be produced. The molded article is then separated from the unmolded rovings by cutting or shearing the glass filaments. This separation may be performed prior to or after the resin impregnated glass article is given a final cure whereby the structure obtains an ultimate strength of at least 200,000 p.s.i. and a 500,000 cycle fatigue life under a flexural stress of at least 90,000 p.s.i. Since the article is molded from a plurality of resin impregnated glass rovings in side-by-side relationship, it will have substantially constant cross sectional area with varying shape.

A better appreciation of the advantages of the invention and a more complete understanding of the practice thereof will be obtained from a detailed description of the process as pratciced in connection with a fabrication of a preferred embodiment thereof, that is, the manufacture of a single leaf automobile spring. During this detailed description, reference will be made to the drawings in which.

Figure 1:
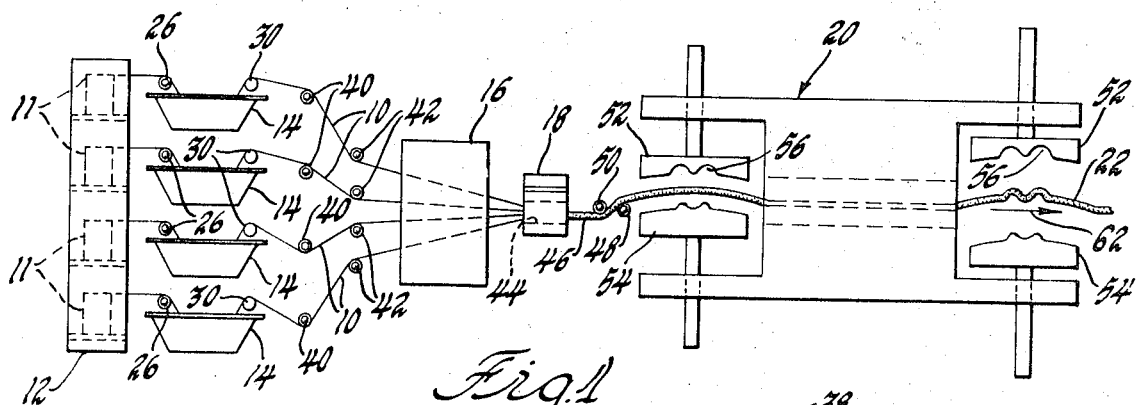
FIG. 1 is a schematic representation of a molding line depicting the equipment employed in the manufacture of fiber glass automobile springs.
Figure 2:
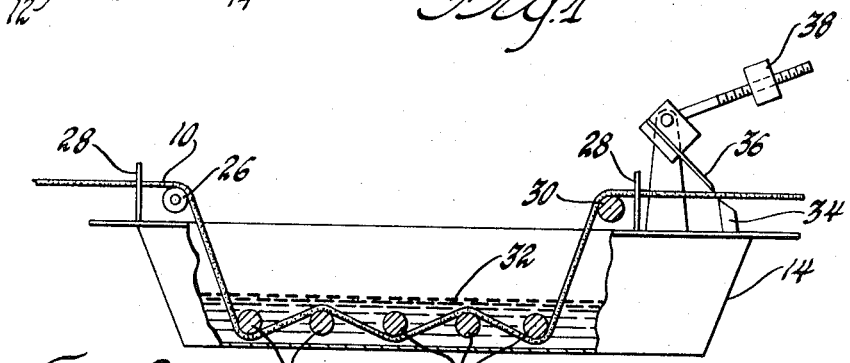
FIG. 2 is a more detailed drawing of a resin impregnating tank used in the practice of the invention.
Figure 4:
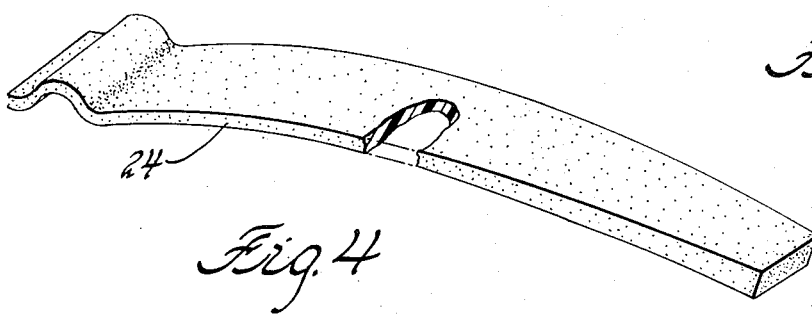
FIG. 4 is a perspective view of a fiber glass automobile spring produced by the invention.

Referring to the drawings and particularly to FIG. 1, the flow of the operations may be traced from left to right. To briefly summarize the process with reference to FIG. 1 it is seen that a plurality of individual fiber glass rovings 10 are pulled from the roving spools 11 in creel 12 through resin impregnating tanks 14. Subsequently, the impregnated rovings 10 are drawn through oven 16, preforming die 18, and then into the molding equipment 20 wherein they are molded into springs 22. In this specific example, two springs are formed together and require separation to produce the final single leaf spring 24, shown in FIG. 4. Creel 12 may be any suitable arrangement, such as a multilevel table, for supporting a plurality of spools of fiber glass rovings. Suitable spacer bars or rods (not shown) are employed, as well as the rollers 26 above the impregnating bath, for paying out of the individual rovings 10, in spaced apart relationship and for controlling the tension in the rovings 10 as they enter the resin tanks 14. As shown in FIG. 2, spacer pins 28 on the impregnating bath are also employed for this purpose. It is preferable that untwisted rovings be employed in the practice of the invention and that the roving spool be wound for an inside draw. The inside draw is preferred because it permits pulling the roving from the spool with minimum tension by avoiding the inertial effects encountered and the braking system required when the spool is unwound from the outside.

Roving 10 is drawn under slight tension over roller 26 into the impregnating bath 14. The bath is filled with a liquid thermosetting resin, preferably solvent free. Examples of suitable resins are epoxy resins, polyester resins, phenolic resins and the like. In traversing the bath, roving 10 is bent over and under a number of steel rods 30 so as to bend and flex the rovings thereby providing more opportunity for the resin to impregnate and coat each filament thereof.

As a specific example, the liquid resin 32 is an epoxy reaction product of bisphenol-A and epichlorohydrin having an epoxide equivalent weight of about 171 to 177. The viscosity of the epoxy resin at 25° C. is 36 to 55 poises. The curing agent which is uniformly mixed with the resin comprises 60% methylene dianiline and 40% m-phenylene diamine. Twenty parts by weight curing agent per hundred parts by weight resin are employed. A coupling agent such as Dow Z 6024 Amine Silane may also be employed in the resin bath to improve the bond between cured resin and glass filaments. 0.6 part by weight coupling agent per hundred parts by weight resin is employed. In the impregnating bath 14, the resin curing agent mixture is maintained at a temperature of about 110° F. to 120° F. so as to have a viscosity of about 7 to 10 poises. Preferably, no solvent is employed with epoxy resins.

Glass fiber roving of the type which may be employed in the invention is commercially available at the present time. It is supplied in spool form from which the roving in unwound. Since it is desirable to wet each filament of the roving with resin, it is preferable that high end count, large filament diameter rovings be employed so as to reduce the number that must be wetted in producing a given cross section. As example of a suitable available filament is one which is about 0.00051" in diameter. Filaments of this diameter are supplied in untwisted rovings comprised of thirty filament ends, each end having 408 filaments. The same filament is also available in rovings comprised of sixty filament ends, each end having 204 filaments. In either case, the roving contained about 12,000 filaments. Thus, it follows that an article produced in accordance with the invention from this particular roving, for example, will contain a very large number of filaments, equivalent to about 12,000 times the number of rovings employed. In general, it is preferred that glass filaments employed in the invention have a diameter of less than about 0.001".

As the impregnated roving is withdrawn from the tank, it is pulled between steel blade 34 and squeege 36 best seen in FIG. 2. Squeege 36 is pivoted and provided with a moveable weight 38 so that the pinching force acting on roving 10 may be controlled. The squeege 36 and the knife blade 34 cooperate to control the amount of resin remaining in the roving mass. After being drawn from the resin impregnating tank 14, each roving 10 is drawn over a set of rollers 40 and 42 which further bend and flex the rovings to work in the resin and align the spaced apart rovings for entrance into oven 16. As the rovings are drawn into oven 16 they are at a temperature of about 100° F. Oven 16 comprises a suitable hot air convection system, the temperature of the air being controlled at about 350° F. Within the oven the spaced apart roving bundles 10 are uniformly heated to a relatively high temperature. At first the viscosity of the epoxy resin on the rovings increases as the cure proceeds to the B-stage wherein the resin would be hard at room temperature and only difficulty soluble in organic solvents. Further heating will temporarily reduce the viscosity of the resin until further reaction cross links the resin to an infusible state. The residence time of a section of roving in the oven 16 is controlled so that the resin preferably just reaches the condition of minimum viscosity. The purpose of heating the rovings 10 prior to molding is to prereact the resin thereby reducing molding time, and in part to reduce the resin viscosity whereby entrapped air or other gases are drawn to the surface of each individual roving and expelled therefrom. Oven 16 is provided with suitable dampers so that as the roving is intermittently advanced along the molding line the temperature of the resin may be controlled to prevent excessive cure prior to the molding step.

The effect of bending and heating the rovings is to more thoroughly wet each individual filament with resin and to assist in the removal of entrained air. Up to this point, each roving has been separately and uniformly treated to provide ample opportunity for this to be accomplished. At this stage the rovings are drawn through an open-ended die 18. Preferably the die is of uniform cross section the width of which preferably is equal to or slightly less than the width of the article to be molded and the height of which is thus equal to or sligtly greater than the thickness of the article to be molded. By being drawn trough die 18 the rovings are brought together in side-by-side relationship into a mass which will more readily fit into the mold 20 and from which the thickness of the article may be positively formed by compression between the mold halves during the molding step. As the individual rovings 10 are brought together in die 18, this bending of the rovings further expels excess resin and also excludes air which might be trapped between the individual rovings. The relatively low viscosity of the partially reacted resin permits the flow of entrained air through the resin, and the removal of excess resin at the entrance end 44 of die 18. The preformed roving mass 46 which is drawn out of die 18 is held together primarily by the natural tackiness of the preheated, partially cured resin. Upon leaving the die 18 and before entering the mold assembly 20, the preformed roving mass passes through two rollers 48 and 50. These rollers locate the mass for entrance into mold assembly 20 and provide means for relieving the tension on the rovings during the molding cycle.

Figure 3:
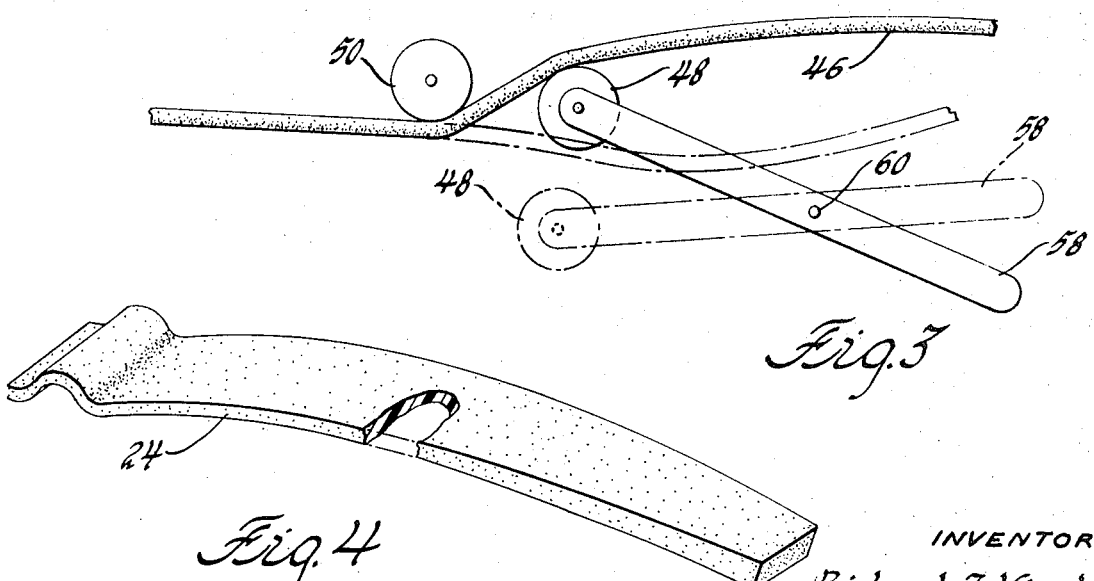
FIG. 3 is a more detailed view of the detensioning rollers used in the practice of the invention.

The roving mass 46 is located within a two-part open-ended mold assembly 20. The mold assembly 20 is comprised of two or more molds as shown in FIG. 1, each having a male mold portion 52 and a female mold portion 54. At this step the roving mass 46 is still of indefinite length and a major portion thereof is actually located within the mold. The tensioned preformed rovings 46 are located over the female portion 54 of the mold. The female portion is raised with the roving still under tension to the point at which the roving mass is forced into the cavity therein and to fan out filling the cavity. The male mold portion is then lowered against the roving mass. At this stage, if there are radius portions 56 in the mold cavity or other irregularities which must be filled, the tension on the roving mass is released. As seen in FIG. 3, this is accomplished by lowering roller 48 by pivoting roller arm 58 about pivot 60. This detensioning is necessary only where the configuration of the cavity is such that a radius 56 could not be uniformly filled if the molding were accomplished with the roving under tension. After detensioning, the heated mold is fully closed under pressure of about 30 to 50 p.s.i. and a temperature of 300° F. to 350° F. The heat effects further curing of the resin at least to the point by which the structure is self-sustaining whereby the closed mold may be employed, if so desired, to pull or advance the rovings through the molding line in the direction indicated by arrow 62 in FIG. 1. In FIG. 1, two molds are shown but a larger number of molds may be employed so that a substantial amount of curing may be accomplished in the mold without intentionally delaying progress in the rest of the molding line. When the molding mass 22 has left the end of the line at the far right of FIG. 1, the molded portions may be severed by means not shown and given a final cure by heating for about 1½ hours at about 330° F. to obtain the desired physical properties. In the embodiment described, the resin content of the finished spring is 24 to 27% by weight. It is preferred that an article produced in accordance with the invention have a resin content of about 24 to 30% by weight.

The specific configuration of the mold will, of course, depend upon the article to be produced and can be suitably modified by means well within the skill of one knowledgeable in the art. All of such articles, however, will be characterized by the fact that a large number of individual rovings will be aligned side by side in a given direction and the properties of the article produced will be somewhat directional. Articles thus produced are different in this respect from those produced from the glass fiber mats or by winding an extremely long filament to produce an elliptical, cylindrical or spherical object. Since all of the rovings which form the article are in side-by-side relationship the area of a transverse section is substantially equivalent to that of any other transverse cross section even though the shape may vary.

It will also be appreciated by one skilled in the art that the process may be modified in several respects. Substantially the same sequence of operations as described may be performed on rovings of relatively short length so that a single article is produced at a time rather than a large number on a continuous basis. It will also be observed that the process may be suitably interrupted after the roving has been drawn through the impregnating tank and the prewetted rovings may be stored in spool form and stored for subsequent processing. In this case, it is suitable to heat the wetted roving to a pre-B-stage state (if epoxy resin is employed) to enhance the wetting of the roving before subsequently cooling and storing. The prewetted rovings may then be heated, preformed and molded as described above. In all the modifications that may be adapted from the above teachings, it will be recognized that the invention provides means of thoroughly and uniformly wetting each of the thousands of filaments comprising the structure that is to be produced. Air or other gases which could create defective voids in the laminate are eliminated during processing. The preheating of the impregnated rovings and preforming before molding effectively produces a structure having excellent physical properties. The invention thus provides strong, light weight members which may be used as automobile springs or other structural members.

Accordingly, while the invention has been described in terms of a specific preferred embodiment, it is thus recognized that other forms may be readily adopted by those skilled in the art and it is therefore limited only by the scope of the following claims.

We claim:

1. A method of molding a substantially void-free composite article which comprises a plurality of elongated glass filaments in substantially side-by-side relationship bonded together with a thermoset synthetic resin, said method comprising impregnating a plurality of individual spaced apart glass filament rovings with a liquid synthetic thermosetting resin, repeatedly flexing and bending the impregnated rovings, and uniformly heating the impregnated rovings while still separated from each other until said thermosetting resin has reacted to a condition of substantially minimum viscosity, the bending, flexing and heating all operatively cooperating to effect wetting of the individual filaments of said rovings by said resin and to expel entrained gas from said resin, bringing together said impregnated rovings in a side-by-side relationship while said resin is still substantially at said minimum viscosity condition under sufficient pressure so as to expel air entrained between said rovings as they are brought into said relationship to form a unitary mass, and subsequently molding said mass under sufficient temperatures and pressure to cure the resin and form said composite article having an ultimate strength of about 200,000 p.s.i. and a void volume of less than about 3%.

2. A method of making a glass filament reinforced synthetic resin structural member having an ultimate strength of at least about 200,000 p.s.i. and a 500,000 cycle fatigue life at a flexural stress of 90,000 p.s.i., said method comprising simultaneously drawing a plurality of individual spaced apart untwisted glass filament rovings under tension through a bath of solvent-free liquid epoxy resin to thoroughly impregnate each of said rovings with said resin, bending and flexing said rovings to wet the filaments of said roving with said resin, uniformly heating each of said resin impregnated rovings for a time sufficient to react said epoxy resin through a condition of relatively high viscosity to a condition of relatively low viscosity, drawing said heated resin impregnated rovings through an open-ended die to preform the spaced apart individual rovings into side-by-side relationship the width of said die being no greater than the narrowest part of said structural member whereby simultaneously with said preforming operation air entrapped between the drawn together rovings is expelled and excess resin is exuded from said rovings, locating said preformed rovings into a two-part open-ended heated mold under tension, said mold defining a cavity of configuration of said structural member, partially closing said mold parts upon said preformed rovings thereby causing them to spread out to fill said mold cavity, detensioning said rovings and immediately fully closing said heated mold to cure said resin to a self-sustaining state, removing the fused member from said mold, trimming off excess resin impregnated glass roving from the ends of said member to obtain the configuration of said article and heating said member to cure said resin whereby a composite glass reinforced synthetic resin structural member having said ultimate strength and fatigue life is obtained.

3. A method of making a glass filament reinforced synthetic resin structural member having an ultimate strength of at least about 200,000 p.s.i. and a 500,000 cycle fatigue life at a flexural stress of 90,000 p.s.i., said method comprising simultaneously drawing a plurality of individual spaced apart untwisted glass filament rovings under tension through a bath of solvent-free liquid epoxy resin to thoroughly impregnate each of said rovings with said resin, bending and flexing said rovings to wet the filaments of said roving with said resin, uniformly heating each of said resin impregnated rovings for a time sufficient to react said epoxy resin through a condition of relatively high viscosity to a condition of relatively low viscosity, drawing said heated resin impregnated rovings while still substantially at said low viscosity through an open-ended die to preform the spaced apart individual rovings into side-by-side relationship the width of said die being no greater than the narrowest part of said structural member whereby simultaneously with said preforming operation air entrapped between the drawn together rovings is expelled and excess resin is exuded from said rovings, molding said preformed rovings in a two-part heated mold defining a cavity of configuration of said structural member, removing the fused member from said mold, trimming off excess resin impregnated glass roving mass from the ends of said member to obtain the configuration of said article and heating said member to cure said resin whereby a glass reinforced synthetic resin structural member having said ultimate strength fatigue life is obtained.

References Cited

UNITED STATES PATENTS

| | | | |
|---|---|---|---|
| 2,526,945 | 10/1950 | Gray | 264—137 |
| 2,721,820 | 10/1955 | Von Reis | 264—174 XR |
| 2,779,388 | 1/1957 | Quoss | 264—137 XR |
| 2,977,630 | 4/1961 | Bazler | 264—174 XR |
| 3,034,566 | 5/1962 | McKay | 156—180 |
| 3,158,519 | 11/1964 | Shannon | 156—180 |
| 3,367,814 | 2/1968 | Weiner | 156—166 |

ROBERT F. WHITE, Primary Examiner

R. R. KUCIA, Assistant Examiner

U.S. Cl. X.R.

156—180; 264—174